United States Patent
Liu et al.

(10) Patent No.: US 7,654,008 B2
(45) Date of Patent: Feb. 2, 2010

(54) CONTOUR MEASURING METHOD FOR MEASURING ASPECTS OF OBJECTS

(75) Inventors: Qing Liu, Shenzhen (CN); Jun-Qi Li, Shenzhen (CN); Takeo Nakagawa, Tokyo (JP)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 209 days.

(21) Appl. No.: 11/966,956

(22) Filed: Dec. 28, 2007

(65) Prior Publication Data

US 2009/0030650 A1 Jan. 29, 2009

(30) Foreign Application Priority Data

Jul. 27, 2007 (CN) .................. 2007 1 0201200

(51) Int. Cl.
*G01B 5/20* (2006.01)
(52) U.S. Cl. .................................. 33/554; 33/503
(58) Field of Classification Search .................. 33/503, 33/551, 553, 554, 555, 556
See application file for complete search history.

(56) References Cited

U.S. PATENT DOCUMENTS

| 5,207,005 | A | * | 5/1993 | Amos et al. | .................... 33/551 |
|---|---|---|---|---|---|
| 5,426,861 | A | * | 6/1995 | Shelton | ........................ 33/503 |
| 6,453,730 | B2 | * | 9/2002 | Takemura | ..................... 33/554 |
| 6,758,085 | B2 | * | 7/2004 | Nagaike et al. | ............... 33/556 |
| 7,398,603 | B2 | * | 7/2008 | Liu et al. | ...................... 33/559 |
| 7,513,027 | B2 | * | 4/2009 | Boehm et al. | ................. 33/551 |
| 2004/0088874 | A1 | * | 5/2004 | Sohn et al. | ..................... 33/554 |
| 2006/0037208 | A1 | * | 2/2006 | McMurtry | .................... 33/554 |

* cited by examiner

*Primary Examiner*—G. Bradley Bennett
(74) *Attorney, Agent, or Firm*—Frank R. Niranjan (57) ABSTRACT

An exemplary contour measuring method for measuring aspects of objects includes: (1) providing a contour measuring probe (10) comprising a tip extension (16), a displacement sensor (19), and a processor (119) connected to the displacement sensor, the tip extension being slidable in a first direction; (2) driving the tip extension to move so as to contact with the object at a first predetermined point, and recording a coordinate of the first predetermined point in the processor; (3) driving one of the tip extension and the object to move, thus, the tip extension contacting with the object at a second predetermined point, the displacement sensor sensing a displacement of the tip extension along the first direction and sending the displacement to the processor, and the processor recording a coordinate of the second predetermined point; and (4) repeating the step (3), the processor recording a series of measured coordinates of points.

15 Claims, 12 Drawing Sheets

CONTOUR MEASURING METHOD FOR MEASURING ASPECTS OF OBJECTS

CROSS-REFERENCE TO RELATED APPLICATIONS

This application is related to nine co-pending U.S. patent applications, which are: application Ser. No. 11/611,724, filed on Dec. 15, 2006, and entitled "DISTANCE MEASURING PROBE WITH AIR DISCHARGE SYSTEM", application Ser. No. 11/843,664, filed on Aug. 23, 2007, and entitled "CONTOUR MEASURING DEVICE WITH ERROR CORRECTING UNIT", application Ser. Nos. 11/966,951 and 11/966,952, and both entitled "CONTOUR MEASURING PROBE", application Ser. No. 11/966,954, and entitled "CONTOUR MEASURING PROBE FOR MEASURING ASPECTS OF OBJECTS", application Ser. No. 11/966,957, and entitled "CONTOUR MEASURING METHOD FOR MEASURING ASPECTS OF OBJECTS", application Ser. No. 11/966,964, and entitled "MEASURING DEVICE FOR MEASURING ASPECTS OF OBJECTS", application Ser. No. 11/966,961, and entitled "MEASURING DEVICE AND METHOD FOR USING THE SAME", and application Ser. No. 11/966,959, and entitled "BASE AND CONTOUR MEASURING SYSTEM USING THE SAME". In Ser. No. 11/611,724, Ser. No. 11/843,664, Ser. No. 11/966,951, and Ser. No. 11/966,957, the inventors are Qing Liu, Jun-Qi Li, and Takeo Nakagawa. In Ser. Nos, 11/966,961, 11/966,964, 11/966,959 and 11/966,952, the inventors are Qing Liu and Jun-Qi Li. In Ser. No. 11/966,954, the inventors are Jian-Bin Kong, and Qing Liu. In Ser. No. 11/611,724 and Ser. No. 11/843,664, the assignee is Hon HAI PRECISION INDUSTRY CO. LTD and FINE TECH Corporation, and the assignee of other applications is HONG FU JIN PRECISION INDUSTRY (ShenZhen) CO., LTD and Hon HAI PRECISION INDUSTRY CO. LTD. The disclosures of the above identified applications are incorporated herein by reference.

BACKGROUND OF THE INVENTION

1. Field of the Invention

The present invention relates generally to contour measuring methods for measuring aspects of objects, and more particularly to a contour measuring method for ultraprecise measuring aspects of objects.

2. Discussion of the Related Art

Figure 12:
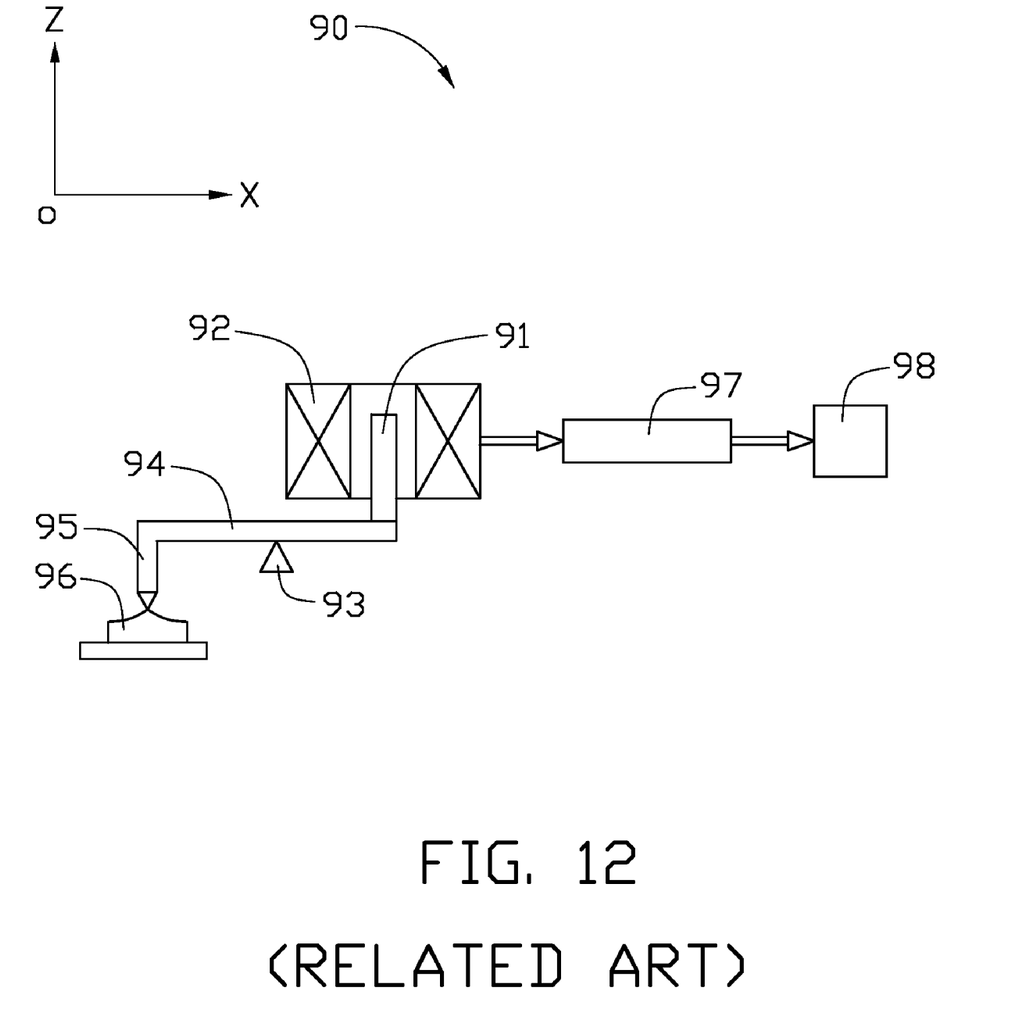
FIG. 12 is a schematic view of a conventional measuring device.

A typical contour measuring method uses a contact probe as its measuring element. Referring to FIG. 12, the measuring device 90 includes a magnetic core 91, a coil 92, a fulcrum 93, a level 94, and a measuring tip 95. A distal end of the measuring tip 95 always contacts with a surface of a workpiece 96. The contour measuring method includes the following steps: (1) driving the workpiece 96 to move along an X-axis; (2) the measuring tip 95 moves along a Z-axis because the workpiece 96 has a curved surface, thus the level 94 rotates about the fulcrum 93; (3) the magnetic core 91 moves in the coil 92, this movement of the magnetic core 91 induces a current in the coil 92; (4) The current flows into the managing circuit 97 and the managing circuit 97 amplifies and transforms the current into a digital value that is used as a signal to the computer 98; (5) the computer 98 calculates a displacement of the magnetic core 91 according to the digital signal, thus indirectly determining a displacement of the measuring tip 95.

However, the above-described contour measuring method has the following disadvantages. Firstly, an error is generated in each of the conversions of converting ordinates of the aspect of the workpiece 96 to displacements of the measuring tip 95, to displacements of the magnetic core 91, to the inductance signals, and to digital signals. Thus, a cumulative error is very large in the contour measuring method. Secondly, a non-linear error is generated when the coil 92 works in a non-linear region of the coil 92. Thirdly, a measuring scope is very small because of the non-linear region of the coil 92.

Therefore, a contour measuring method for measuring aspects of objects which have high precision are desired.

SUMMARY

An exemplary contour measuring method for measuring aspects of objects includes: (1) providing a contour measuring probe comprising a tip extension, a displacement sensor, and a processor connected to the displacement sensor, the tip extension being slidable in a first direction, and the displacement sensor used to sense a displacement of the tip extension, and the tip extension always contacting with a surface of the object; (2) driving the tip extension to move so as to contact with the surface of the object at a first predetermined point, and recording a coordinate of the first predetermined point in the processor; (3) driving one of the tip extension and the object to move, thus, the tip extension contacting with the surface of the object at a second predetermined point, the displacement sensor sensing a displacement of the tip extension along the first direction and sending the displacement to the processor, and the processor recording a coordinate of the second predetermined point; and (4) repeating the step (3), the processor recording a series of measured coordinates of predetermined points.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present contour measuring method for measuring aspects of objects. Moreover, in the drawings, like reference numerals designate corresponding parts throughout the several views, and all the views are schematic.

DETAILED DESCRIPTION OF THE EMBODIMENTS

A contour measuring method of the present invention preferably applies a contacting measuring device.

Figure 1:
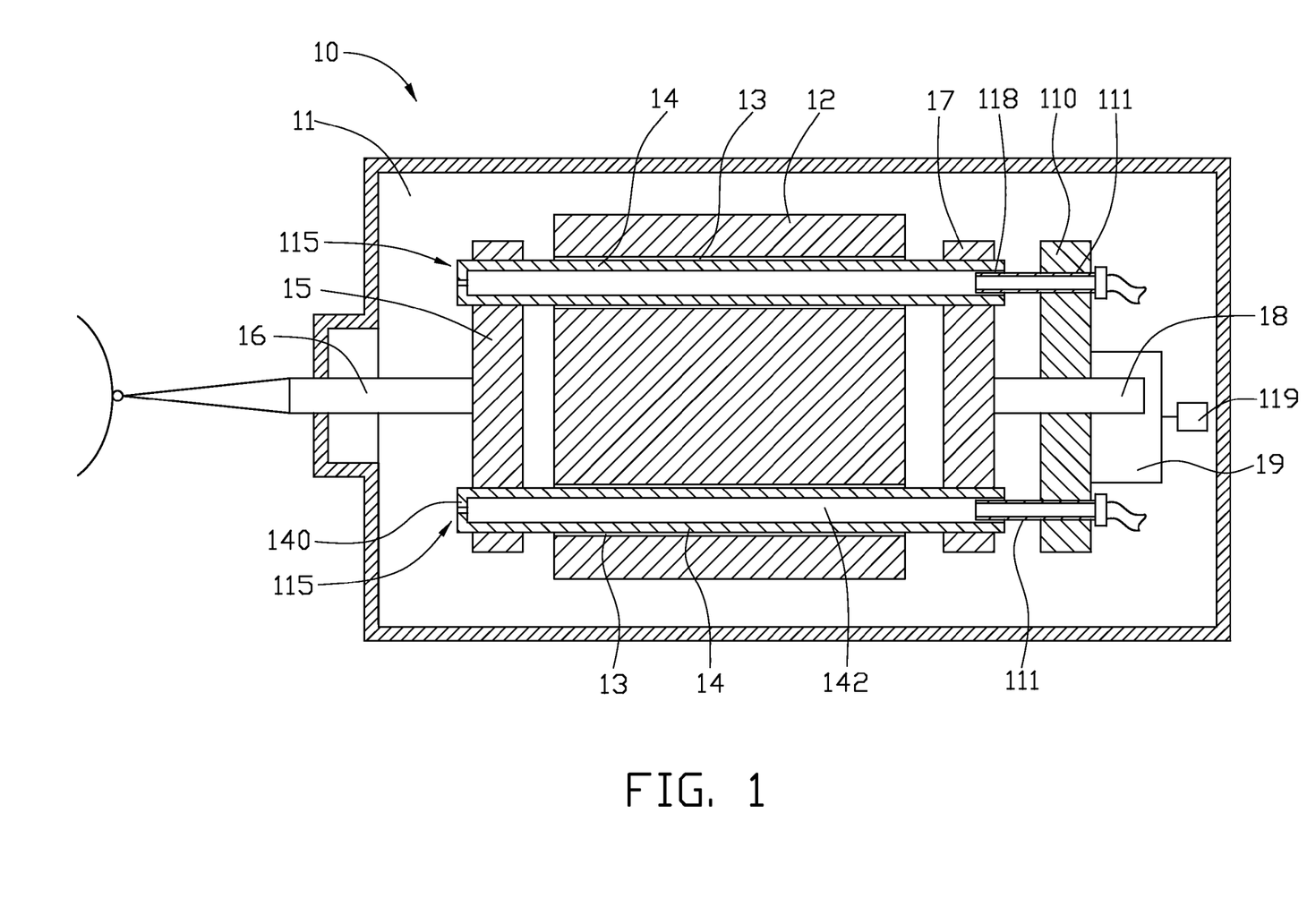
FIG. 1 is a top plan, cross-sectional view of a contour measuring probe in accordance with a first embodiment applied in a contour measuring method for measuring aspects of objects of the present invention, and the contour measuring probe including a pair of hollow tubes and a pair of pipes.
Figure 2:
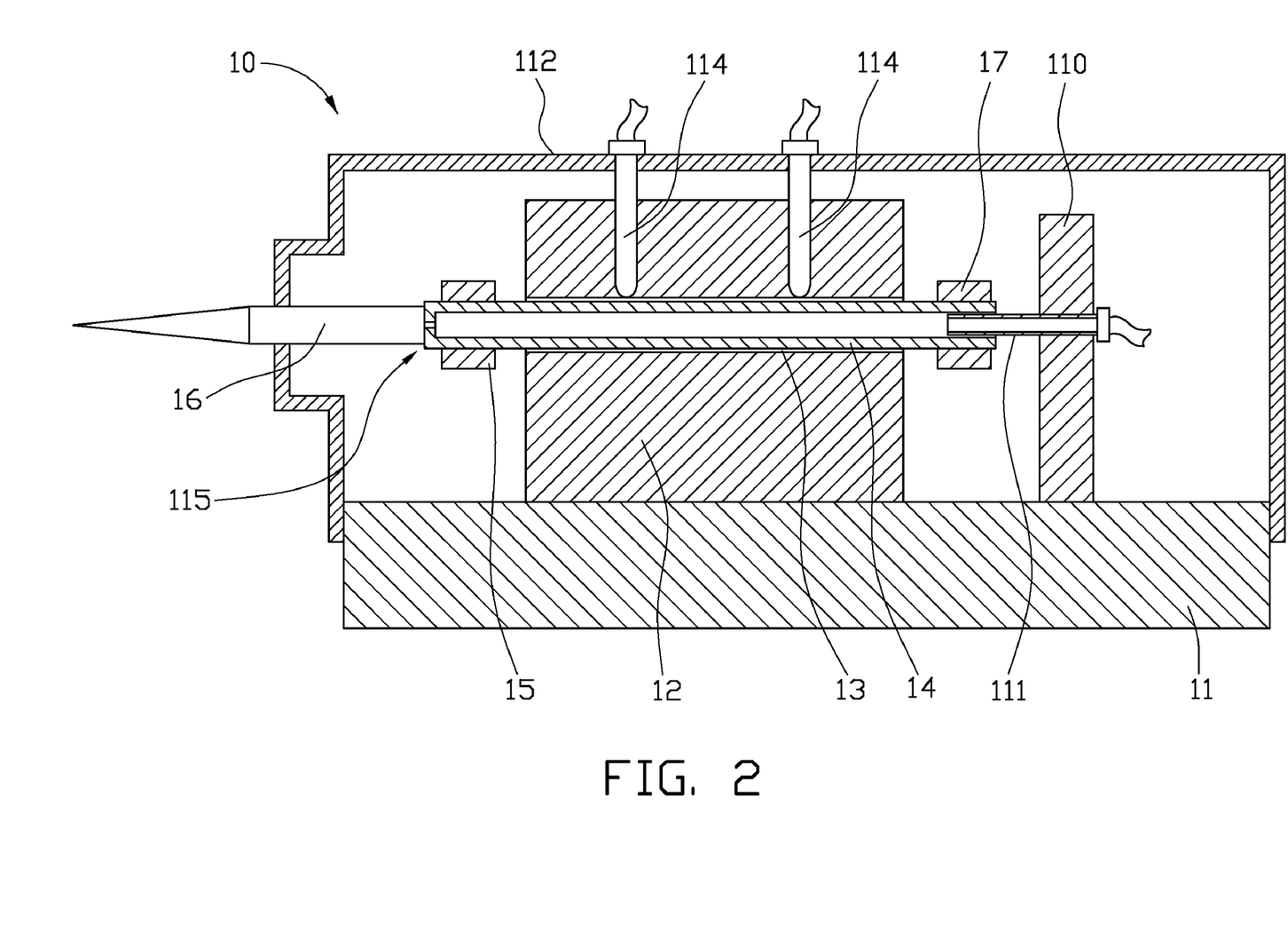
FIG. 2 is a side, cross-sectional view of the contour measuring probe of FIG. 1.

Referring to FIGS. 1 and 2, a contour measuring probe 10 in accordance with a first embodiment is shown. The contour measuring probe 10 includes a base 11, a tube guide 12, two hollow tubes 14, a first tube frame 15, a tip extension 16, a second tube frame 17, a linear measuring scale 18, a displacement sensor 19, a pipe holder 110, two pipes 111, and a processor 119. The hollow tubes 14 and the first and second frames 15, 17 cooperatively form a movable rack (not labeled).

The base 11 is substantially a flat rectangular sheet. It should be understood that the base 11 may alternatively be any other suitable shapes. The tube guide 12 is securely mounted onto the base 11. The tube guide 12 has a front end and a rear end. The tube guide 12 defines two tube chutes 13 each extending from the front end to the rear end. The tube chutes 13 are spaced apart from, and aligned parallel to each other.

Each of the hollow tubes 14 is a cylinder defining a cavity 142 that extends through the hollow tube 14 from a rear open end of the hollow tube 14 to a front cylinder base 140 of the hollow tube 14. Each hollow tube 14 is received through a corresponding tube chute 13 of the tube guide 12. The rear open ends of the hollow tubes 14 protrude out from the rear end of the tube guide 12 and are fixed onto the second tube frame 17. The cylinder bases 140 of the hollow tubes 14 protrude out from the front end and are fixed onto the first tube frame 15. An outer diameter of the hollow tubes 14 is configured to be smaller than a diameter of the tube chutes 13, so that a gap (not labeled) is defined between each hollow tube 14 and the tube guide 12. Air is continuously pumped into the gap between the hollow tubes 14 and the tube guide 12 at a predetermined rate. Thus, an air bearing (not labeled) is formed between each hollow tube 14 and the tube guide 12 when the gaps are filled with air.

Each of the pipes 111 is partially inserted into the open end of a corresponding hollow tube 14. An outer diameter of the pipes 111 is smaller than an inner diameter of the cavities 142 of the hollow tubes 14, so that a gap 118 is defined between each pipe 111 and the corresponding hollow tube 14. An air bearing (not labeled) is formed between each pipe 111 and the corresponding hollow tube 14 when air is pumped into the cavities 142 of the hollow tubes 14 via the pipes 111. Therefore, friction between the hollow tubes 14 and the tube guide 12, and between the pipes 111 and the hollow tubes 14, is significantly small correspondingly. As a result, the hollow tubes 14 are able to move smoothly in the tube chutes 13 correspondingly. It should be understood that the gaps 118 may be omitted, and as an alternative, a lubricant can be applied between the pipes 111 and the hollow tubes 14 to reduce friction.

The pipe holder 110 is fixed on the base 11. The pipe holder 110 is configured to hold the pipes 111 in position. When air is pumped into the cavities 142 of the hollow tubes 14, an air current inside the cavities 142 creates a pushing force that pushes the hollow tube 14 away from the pipes 111, thereby driving the tip extension 16 away from the second tube frame 17. The air pumped into the cavities 142 of the hollow tubes 14 and the tube chutes 13 may also be any suitable kinds of gas such as oxygen, nitrogen, etc.

The tip extension 16 is needle-shaped, and has a contact tip (not labeled) that touches a surface of an object when the contour measuring probe 10 is used to measuring the object. The tip extension 16 is fixed on the first tube frame 15 so that the tip extension 16 is linearly movable together with the movable rack. The linear measuring scale 18 is fixed on the second tube frame 17 such that it moves (displaces) linearly when the movable rack moves. The displacement sensor 19 is mounted on the base 11 corresponding to the linear measuring scale 18. The displacement sensor 19 is used for reading displacement values of the linear measuring scale 18. Alternatively, the positions of the linear measuring scale 18 and the displacement sensor 19 may be exchanged.

Again referring to FIG. 2, the contour measuring probe 10 further includes a cover 112 that engages with the base 11 and completely seals other various components of the contour measuring probe 10 except the base 11 and a part of the tip extension 16. The cover 112 defines an opening (not labeled) for allowing an end portion including the contact tip of the tip extension 16 to extend out from the opening. The air is pumped into the gaps between the tube guide 12 and the hollow tubes 14 to form the air bearing via a plurality of tubes 114 mounted to the cover 112.

The contour measuring probe 10 further includes an air discharge system 115. The air discharge system 115 is configured to eject air out of the cavity 142 of each hollow tube 14. The air discharge system 115 can be selected from one or more of a group of a first air eject hole (not shown) defined in a center of the cylinder base 140 of each hollow tube 14; a second air eject hole (not shown) defined in the cylinder base 140 of each hollow tube 14 and a plurality of peripheral air eject holes (not shown) defined in the cylinder base 140 and surrounding the second air eject hole; a plurality of third air eject holes (not shown) defined in the cylinder base 140 of each hollow tube 14; a plurality of cylindrical fourth air eject holes (not shown) defined in a sidewall of each hollow tube 14; and the gap 118 between each hollow tube 14 and the corresponding pipe 111. That is, the air discharge system 115 is a channel communicating an outer of the hollow tube 14 and the cavity 142 of the hollow tube 14.

In alternative embodiments, the contour measuring probe 10 can include only one hollow tube 14 or more than two hollow tubes 14. In such embodiments, there can correspondingly be only one pipe 111 or more than two pipes 111. The tube guide 12 may define only one tube chute 13 or more than two tube chutes 13 corresponding to the number of the hollow tubes 14.

In use, the contour measuring probe 10 is placed near the object. The pipes 111 and the tubes 114 communicate with an air chamber (not shown), and air is pumped into the cavities 142 of the hollow tubes 14 and the gaps between the tube guide 12 and the hollow tubes 14. When the contact tip of the tip extension 16 touches the object, the movable rack together with the tip extension 16 stops moving. When the tip extension 16 and correspondingly the linear measuring scale 18 move from one position to another position, the displacement sensor 19 detects and reads a displacement of the linear measuring scale 18. That is, a displacement of the tip extension 16 is measured. The displacement sensor 19 connected to the processor 119 sends the displacement of the tip extension 16 to the processor 119.

Figure 3:
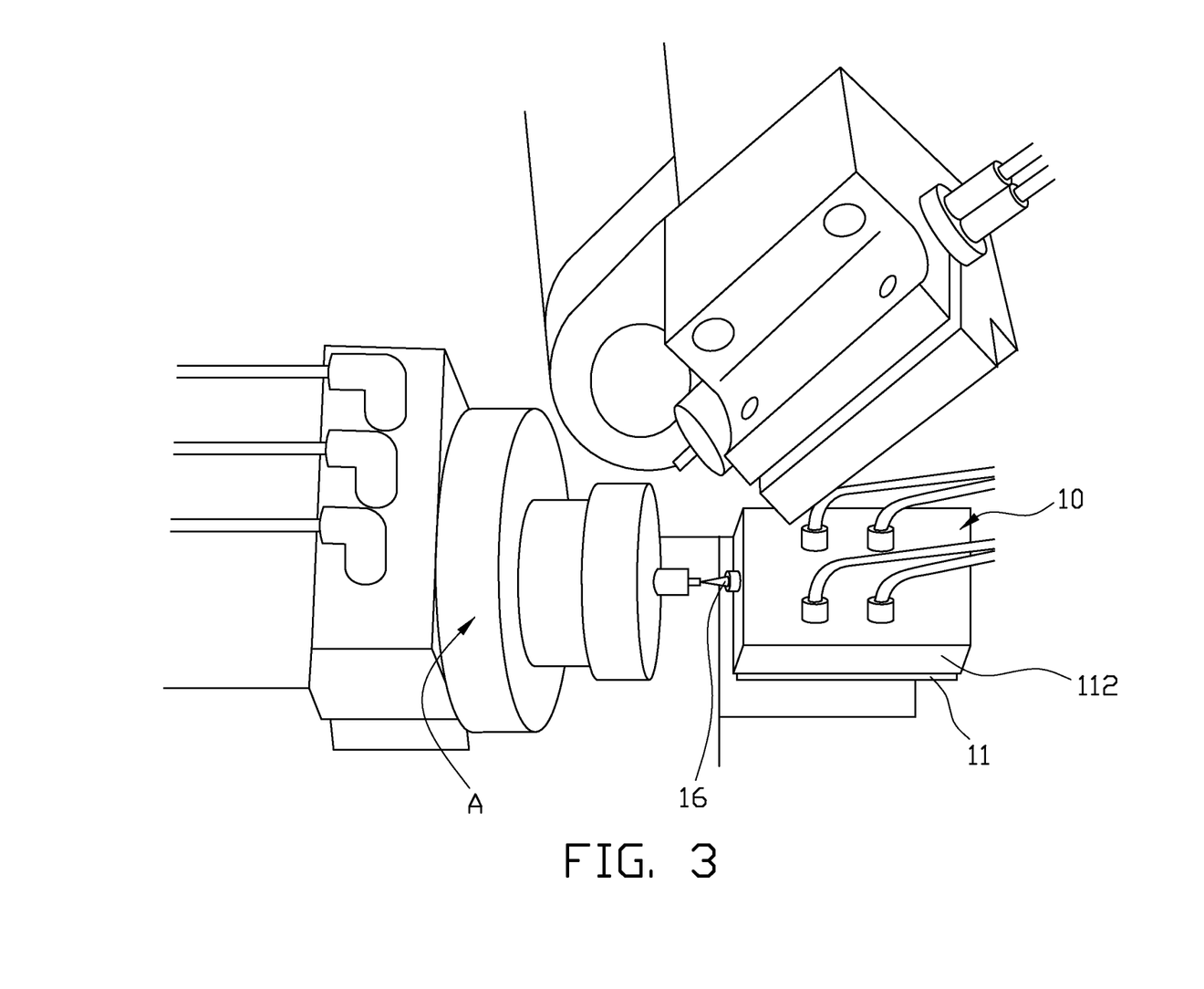
FIG. 3 is an isometric view of an exemplary application of the contour measuring probe of FIG. 1.

When manufacturing precision components such as optical lenses, the optical lenses generally need to be re-machined if they do not have desired shape and size. Referring to FIG. 3, the contour measuring probe 10 is applied in an ultraprecise equipment A for manufacturing optical lenses. The optical lenses are measured on the ultraprecise equipment A immediately after being machined. Therefore, error caused by releasing the optical lenses from a machining equipment and reclamping the optical lenses on a measuring machine no longer exists. In addition, much time can be saved. The contour measuring probe 10 is mounted on a slidable platform of the ultraprecise equipment A. The ultraprecise equipment A includes a master actuator that moves the contour measuring probe 10 and the slidable platform in at least one direction. The processor 119 is further connected to the master actuator of the ultraprecise equipment A to record a displacement of the slidable platform.

When air is pumped into the cavities 142 of the hollow tubes 14, air pressure in the cavities 142 pushes air out of the hollow tubes 14 via the air discharge systems 115. That is, air is continuously pumped into the hollow tubes 14 via the pipes 111 and continuously ejected out of the hollow tubes 14 via the air discharge systems 115. The air pumped into the hollow tubes 14 creates an air current that pushes the hollow tubes 14 to move in a direction that the hollow tubes 14 move out of the tube guide 12. The air pressure pushing the hollow tubes 14 is relatively small and steady. That is, an overall measuring force that pushes the tip extension 16 is relatively small and steady. As a result, the tip extension 16 of the contour measuring probe 10 is pushed so that the contact tip 162 gently touches the object. Thus, the contact tip of the tip extension 16 and the object are not easily deformed or damaged, thereby improving a precision of measurement. In addition, a pressure inside the cover 112 is kept higher than that of the environment outside the cover 112, because air ejecting out of the air bearings and the hollow tubes 14 fills the cover 112. Thus, dust and other particles are prevented from entering the cover 112 through any openings thereof.

Figure 4:
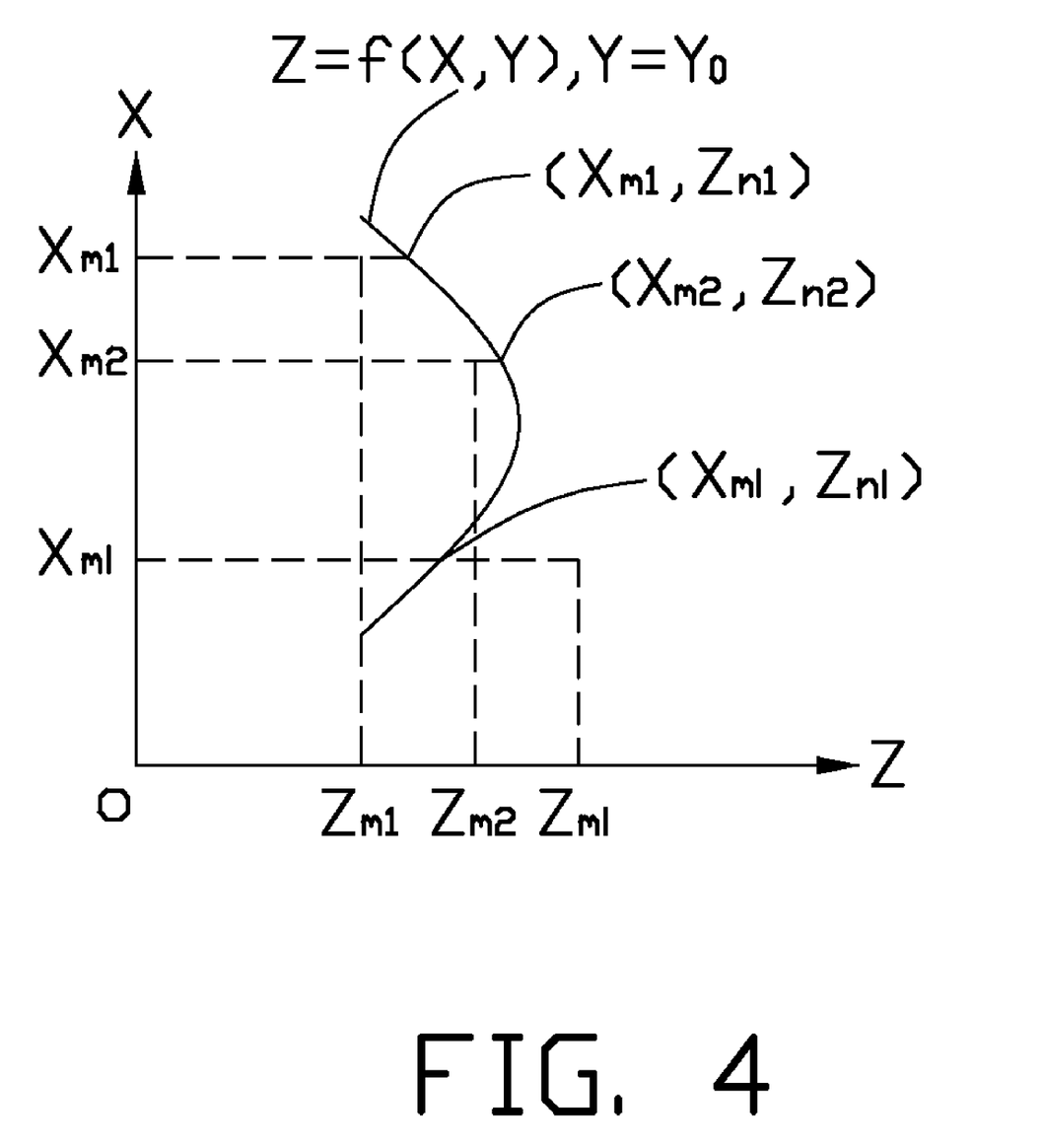
FIG. 4 is a comparing chart showing measuring values and predetermined ideal values from the present contour measuring method.
Figure 5:
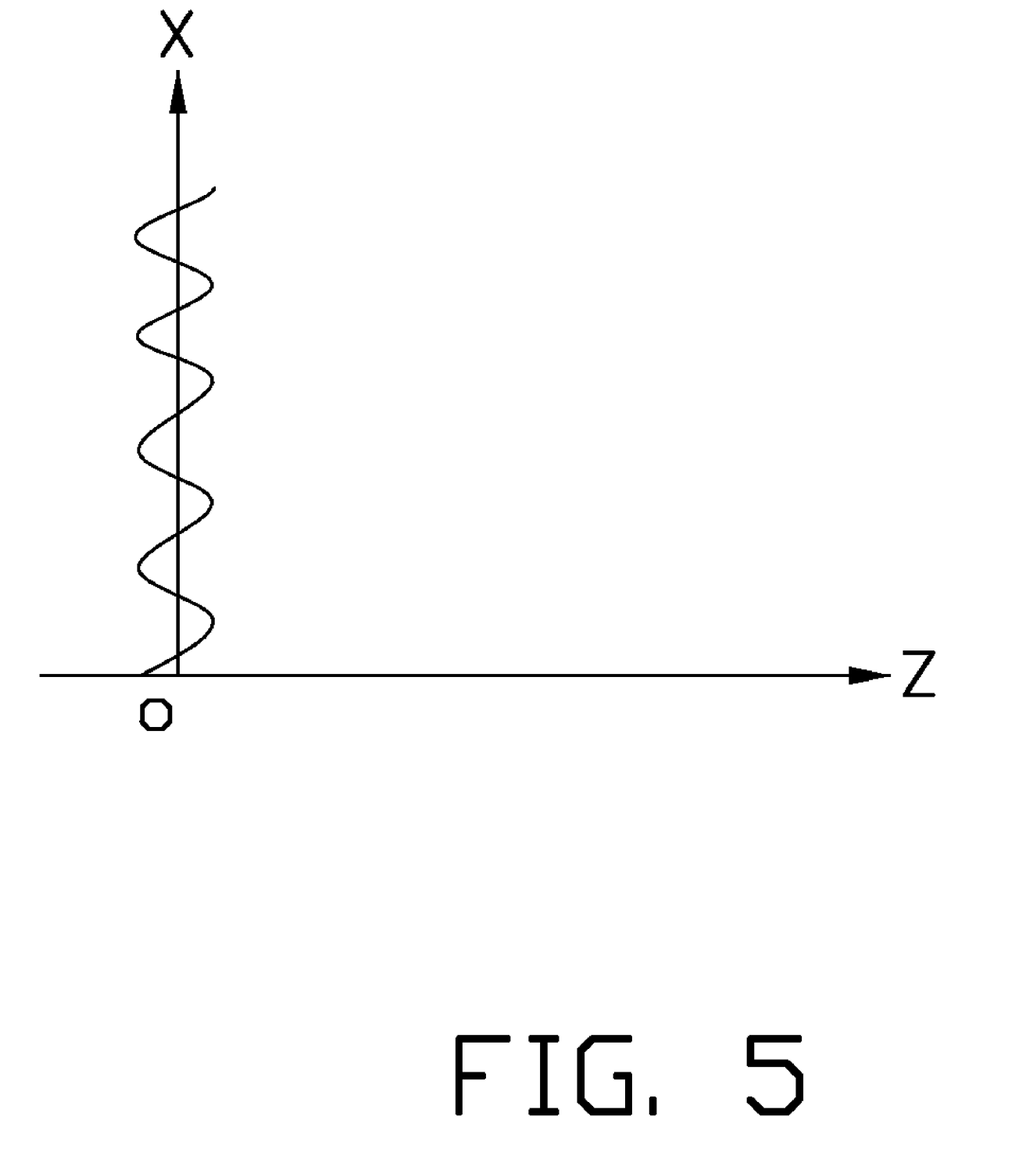
FIG. 5 is a chart showing difference between the measuring values and predetermined ideal values of FIG. 5.

Referring to FIG. 4 and FIG. 5, the contour measuring method is detailed described as follows when the tip extension 16 of the contour measuring probe 10 moves relative an XZ plane of $Y=Y_0$.

(1) The contour measuring probe 10 is first driven to move parallel the XZ plane to a first predetermined point. At the same time, the tip extension 16 is pushed out of the 20 against, a surface of the object, and moved along (in contact) the surface of the object to a predetermined point. At the first predetermined point, the processor 119 records a coordinate of the first predetermined point such as $(0, Y_0, 0)$.

(2) The contour measuring probe 10 is then driven to move to a second predetermined point, while the tip extension 16 remains pushing against the surface. At the second predetermined point, and the second point such as $(X_{m1}, Y_0, Z_{m1})$ is sensed by the displacement sensor 19 and recorded in the processor 119.

(3) The 20 is sequentially moved to a series of predetermined point, thus the processor 119 will obtain a series of successive point coordinates of $(X_{m2}, Y_0, Z_{m2})$, $(X_{m3}, Y_0, Z_{m3})$, $(X_{m4}, Y_0, Z_{m4})$ ... $(X_{mi}, Y_0, Z_{mi})$.

(4) The processor 119 calculates a series of ideal coordinates according to a function $Z=f(X, Y)$ of an aspect of an ideal object. That is, the processor 119 calculates a series of ideal coordinates of points of a surface of the ideal object as $(X_{m1}, Y_0, Z_{n1})$, $(X_{m2}, Y_0, Z_{n2})$, $(X_{m3}, Y_0, Z_{n3})$, $(X_{m4}, Y_0, Z_{n4})$ ... $(X_{mi}, Y_0, Z_{ni})$.

(5) The processor 119 compares the measured coordinates with the ideal coordinates to gain a difference between a real aspect (Here, the measured aspect is regarded as the real aspect) and the ideal aspect of the object. Thus, a series of difference values along the Z-axis between the measured coordinates with the ideal coordinates are gained as $\Delta Z_1 = Z_{m1} - Z_{n1}$, $\Delta Z_2 = Z_{m2} - Z_{n2}$, $\Delta Z_3 = Z_{m3} - Z_{n3}$ ... $\Delta Z_i = Z_{mi} - Z_{ni}$.

(6) The tip extension 16 is driven to move to other XZ planes of $Y=Y_1, Y=Y_2, Y=Y_3 ... Y=Y_i$ and the steps of (1)-(5) are repeated.

(7) The processor 119 contains a compensative software and a machining software therein. A path of a tool of the machining equipment of the ultraprecise equipment A is controlled by the machining software. When the object is machined and measured on the same ultraprecise equipment A, the processor 119 runs the compensative software to modify machining parameters in the machining software according to the difference values along the Z-axis $\Delta Z_i$ after measuring and before further machining.

Alternatively, the tip extension 16 can be driven to move in a space of XYZ. Similarly, a series of values $\Delta Z_i$ of difference along the Z-axis between the measured coordinates with the ideal coordinates can be gained. Alternatively, the tip extension 16 may be fixed, while the object is driven to move.

Figure 6:
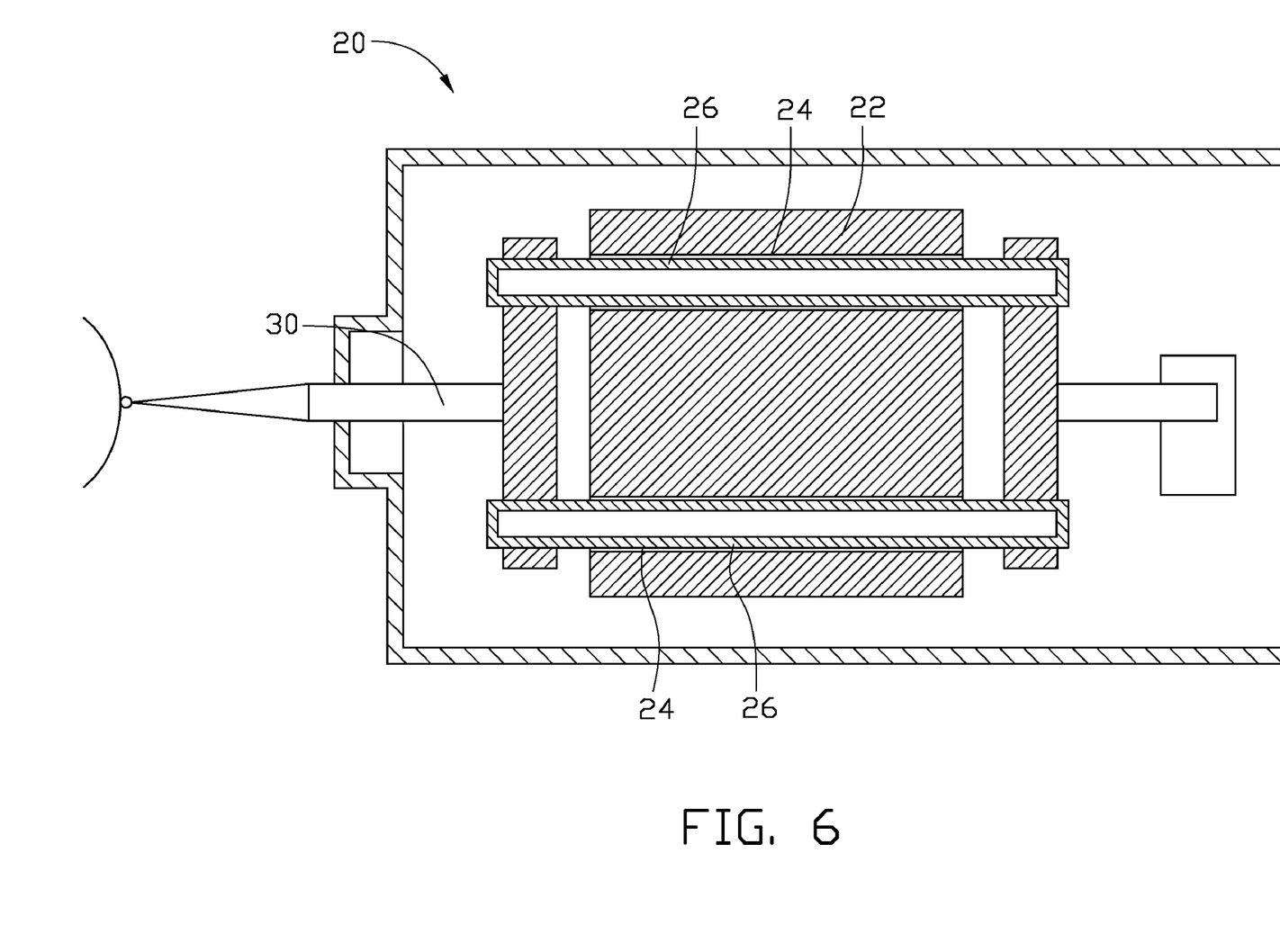
FIG. 6 is a top plan, cross-sectional view of a contour measuring probe in accordance with a second embodiment applied in a contour measuring method for measuring aspects of objects of the present invention, and the contour measuring probe including a pair of hollow tubes and a pair of pipes.
Figure 7:
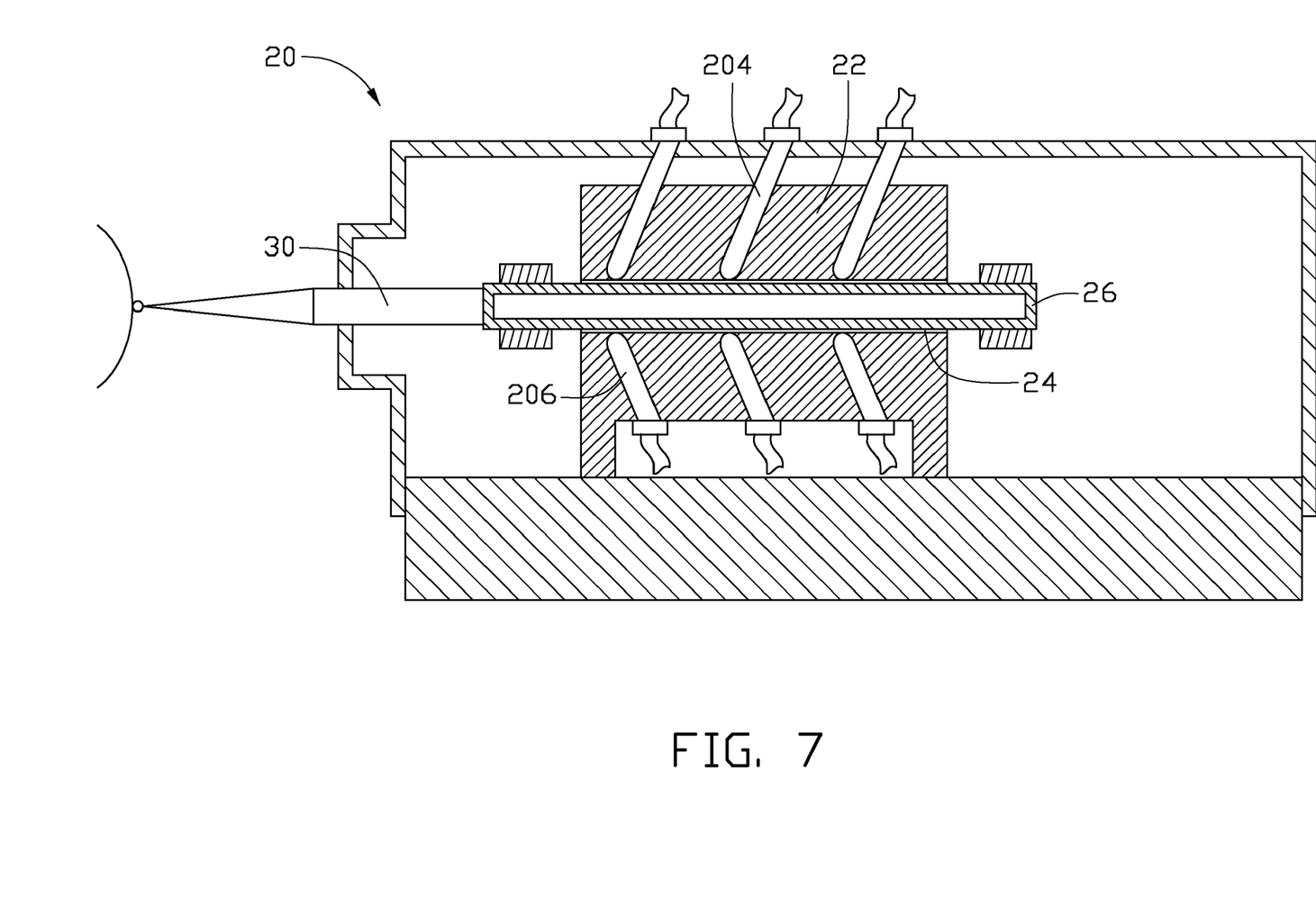
FIG. 7 is a cross-sectional view of the contour measuring probe of FIG. 6.

The contour measuring method can also use other measuring devices, for example, referring to FIG. 6 and FIG. 7, a contour measuring probe 20 in accordance with a second embodiment described as follows.

The contour measuring probe 20 is similar to the contour measuring probe 10 except that the contour measuring probe 20 does not include the pipes 111 (shown in FIG. 2) and includes a plurality of tubes 204, 206 obliquely disposed in a tube guide 22 relative to hollow tubes 26. The contour measuring probe 20 includes the tube guide 22, two hollow tubes 26 and a tip extension 30. The tubes 204 are oblique relative to an axis of the hollow tubes 26. That is, an angle defined by extension directions of the tubes 204 relative to the axis of the hollow tubes 26 is in a range from larger than 0° and smaller than 90°. The tubes 204, 206 are respectively parallel to and spaced from each other, and are communicated with tube chutes 24 defined in the tube guide 22. The tubes 206 are symmetrical to the tubes 204 relative to the axis of the hollow tubes 26, and the tubes 204, 206 are disposed in a same plane. Also, the tubes 206 may be not symmetrical to the tubes 204, but stagger with the tubes 204 so long as a force performed on the hollow tubes 26 at all directions except a moving direction of the tip extension 30 is balance. Alternatively, the tubes 206 can be omitted. With the condition, the hollow tubes 26 may offset under a force performed thereon in a direction perpendicular to the axis of the hollow tubes 26.

Figure 8:
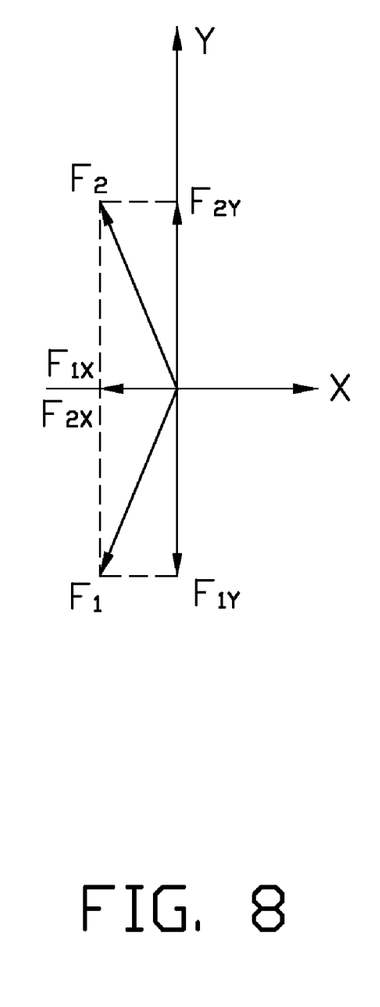
FIG. 8 is a force analysis view of hollow tubes of the contour measuring probe of FIG. 6.
Figure 9:
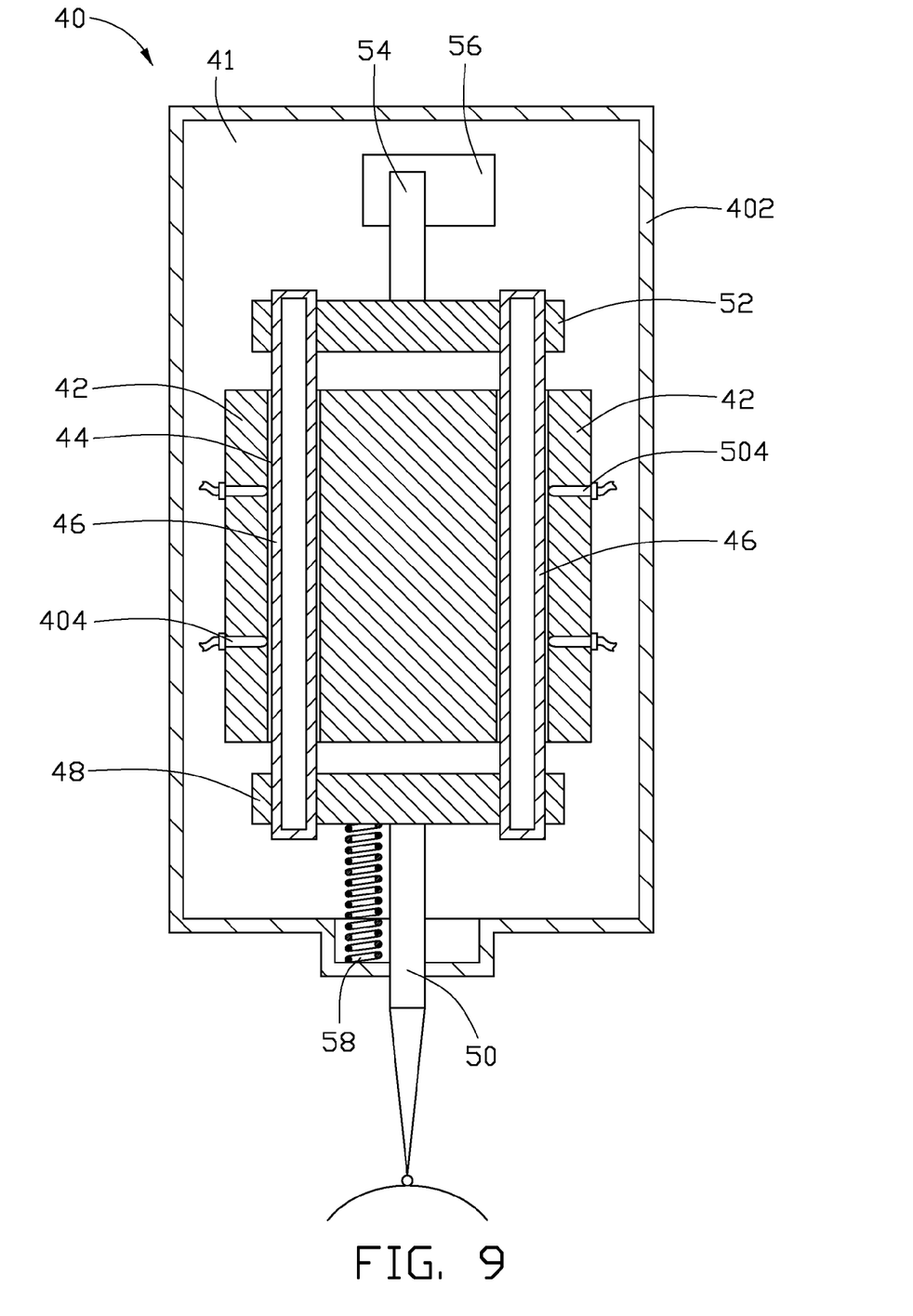
FIG. 9 is a top plan, cross-sectional view of a contour measuring probe in accordance with a third embodiment applied in a contour measuring method for measuring aspects of objects of the present invention, and the contour measuring probe including a pair of hollow tubes and a pair of pipes.

Referring to FIG. 8, when air is pumped into the tube chutes 24 and forces on a sidewall of the hollow tubes 26 via the tubes 204, 206, air from the tubes 204 performs a force $F_1$ and air from the tubes 206 performs a force $F_2$ on the hollow tubes 26. A value of the force F1 is the same as that of the force $F_2$ because the number of the tubes 204 is same as that of the tubes 206 and the tubes 206 and the tubes 204 are symmetrically disposed. Therefore, a force performed on the hollow tubes 26 in an X-direction shown in FIG. 8 is $F_{1X}+F_{2X}$, and a force performed on the hollow tubes 26 in a Y-direction is 0. The force $F_{1X}+F_{2X}$ pushes the hollow tubes 26 together with the tip extension 30 to move. In addition, an air bearing is formed when air is filled in a gap between the tube guide 22 and the hollow tubes 26. Therefore, a friction between the tube guide 22 and the hollow tubes 26 is significantly small.

Figure 10:
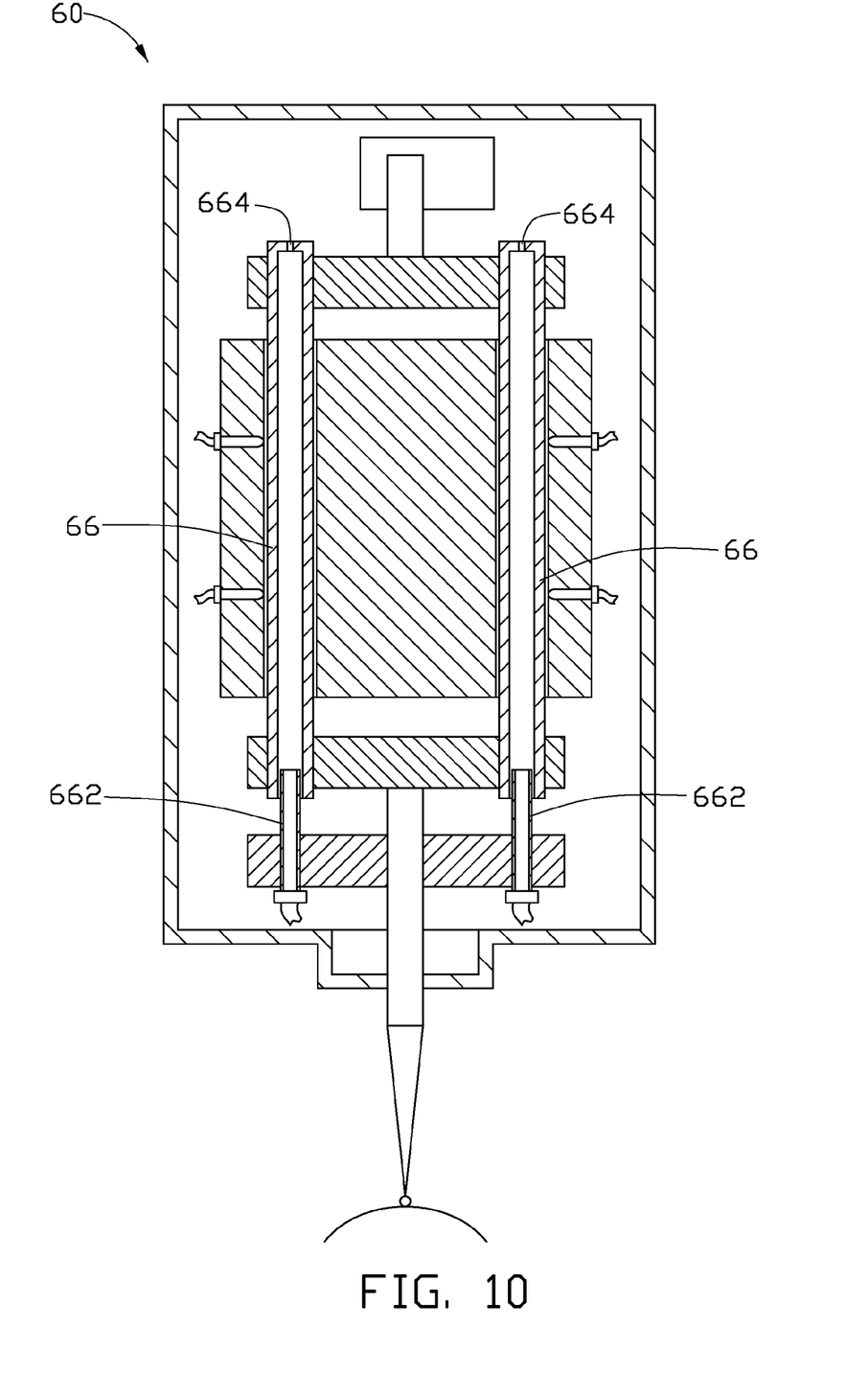
FIG. 10 is a top plan, cross-sectional view of a contour measuring probe in accordance with a fourth embodiment applied in a contour measuring method for measuring aspects of objects of the present invention, and the contour measuring probe including a pair of hollow tubes and a pair of pipes.

Referring to FIG. 10, a contour measuring probe 40 in accordance with a third embodiment described as follows may also be used in the contour measuring method.

The contour measuring probe 40 is similar to the contour measuring probe 10 except that the contour measuring probe 40 is a vertical type measuring device which using a gravity of a movable rack including a tube guide 42, two hollow tubes 46, a first frame 48, a second frame 52, and a tip extension 50 as a measuring force. The contour measuring probe 40 does not include the pipes 111 (shown in FIG. 2), while includes an elastic member 58 to support the movable rack. The contour measuring probe 40 includes a base 41, the tube guide 42, the hollow tubes 46, the first frame 48, the second frame 52, the tip extension 50, a linear measuring scale 54, a displacement sensor 56, a cover 402, and the elastic member 58. The elastic member 58 is a screwed, columned spring. An extension direction of the elastic member 58 is parallel to a direction of gravity and the elastic member 58 is compressed. Therefore, a part of the gravity is balanced by an elastic force of the elastic member 58. Thus, a measuring force of the tip extension 50 is reduced so that the contact tip of the tip extension 50 and the object are not easily deformed or damaged, thereby improving a precision of measurement.

Referring to FIG. 10, a contour measuring probe 60 in accordance with a fourth embodiment described as follows may also be used in the contour measuring method.

The contour measuring probe 60 is similar to the contour measuring probe 40 except that the contour measuring probe 60 does not include the elastic member 58 and further includes two pipes 662 for allowing air to be pumped into a cavity of each of two hollow tubes 66. The hollow tubes 662 are disposed at a bottom end of the hollow tubes 66. A flowing direction of air pumped into the hollow tubes 66 is contrary to a direction of gravity. Therefore, a part of the gravity is balanced by a pushing force of air.

Figure 11:
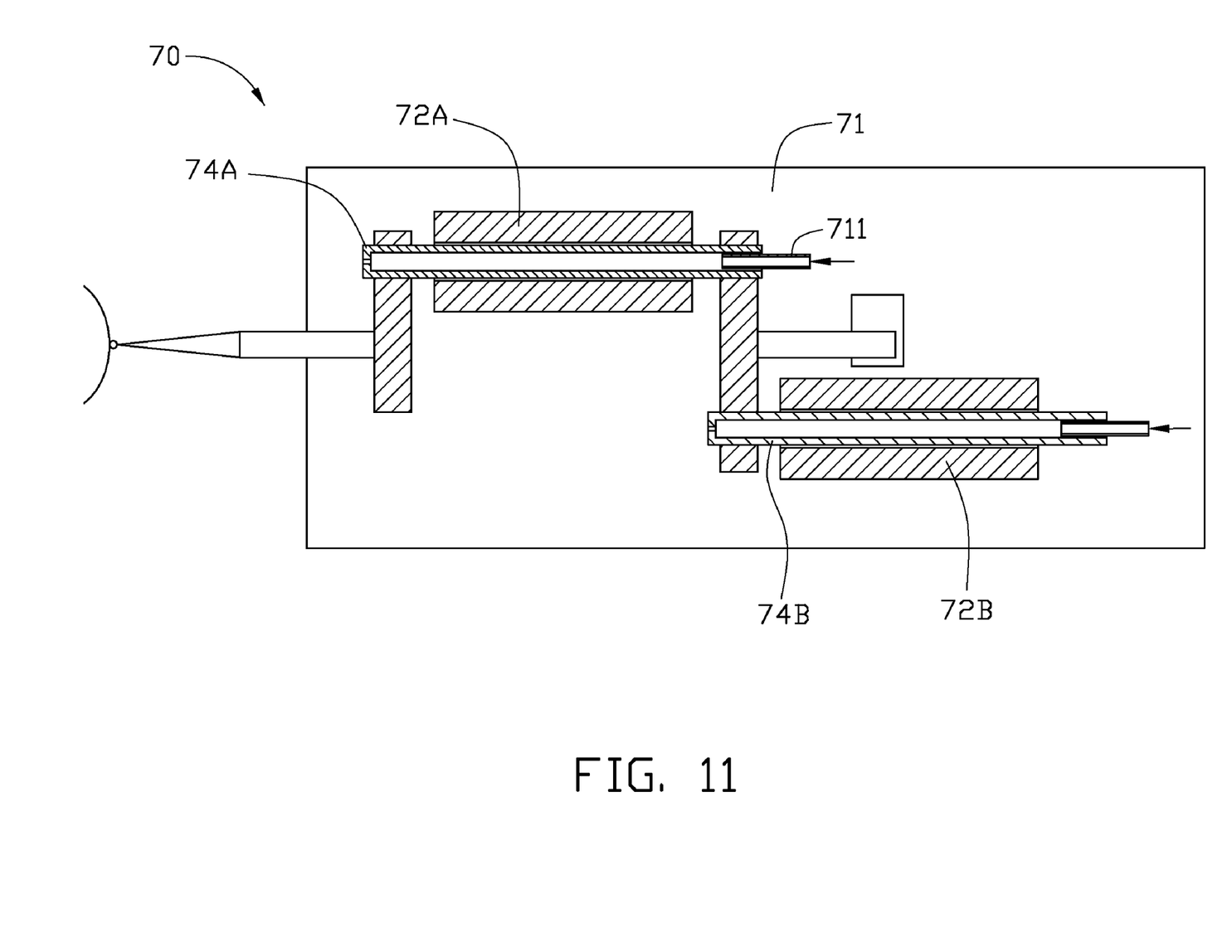
FIG. 11 is a top plan, cross-sectional view of a contour measuring probe in accordance with a fifth embodiment applied in a contour measuring method for measuring aspects of objects of the present invention, and the contour measuring probe including a pair of hollow tubes and a pair of pipes.

Referring to FIG. 11, a contour measuring probe 70 in accordance with a fifth embodiment described as follows may also be used in the contour measuring method.

The contour measuring probe 70 is similar in principle to the contour measuring probe 10 except that tube guides 72A, 72B for holding hollow tubes 74A, 74B are offset from each other in the contour measuring probe 70. That is, the tube guide 72A is set at a front portion of the base 71, and the tube guide 72B is set at a back portion of the base 71. Because the tube guides 72A, 72B are offset from each other, the tube guides 72A, 72B in combination hold the hollow tubes 74A, 74B along a greater length as measured along a direction coinciding with an axis of movement of the tip extension (not labeled), compared with a corresponding length along which the tube guide 12 holds the tip extension 16 in the contour measuring probe 10. Thereby, the tip extension of the contour measuring probe 70 can move very steadily forward and backward with little or no lateral displacement. Alternatively, the contour measuring probe 70 can includes one pipe 711 only. Accordingly, air is pumped into one of the hollow tubes 74A, 74B. Thereby, the contour measuring probe 70 is further simplified.

Similarly, the hollow tubes 24, 44, 64 of the contour measuring probe 20, 40, 60 may also be offset from each other as the hollow tubes 72A, 72B in the contour measuring probe 70.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A contour measuring method for measuring aspects of objects comprising the steps:
   (1) providing a contour measuring probe comprising a tip extension, a displacement sensor, and a processor connected to the displacement sensor, the tip extension being slidable in a first direction, and the displacement sensor used to sense a displacement of the tip extension, and the tip extension always contacting with a surface of the object;
   (2) driving the tip extension to move and contact with the surface of the object at a first predetermined point, and recording a coordinate of the first predetermined point in the processor;
   (3) driving one of the tip extension and the object to move, thus, the tip extension contacts the surface of the object at a second predetermined point, the displacement sensor sensing a displacement of the tip extension along the first direction and sending the displacement to the processor, and the processor recording a coordinate of the second predetermined point; and
   (4) repeating the step (3), the processor recording a series of measured coordinates of points on the surface of the object.

2. The contour measuring method as claimed in claim 1, wherein the contour measuring method further comprising the step of: the processor calculating a series of ideal coordinates of points of an ideal object and comparing the measured coordinates of the predetermined points with the ideal coordinates to gain a series of difference values between the measured coordinates with the ideal coordinates.

3. The contour measuring method as claimed in claim 2, wherein the contour measuring method further comprising the step of: the processor containing a compensative software and a machining software therein, the processor running the compensative software to modify machining parameters in the machining software according to the difference values.

4. The contour measuring method as claimed in claim 1, wherein the tip extension is driven to move in at least one direction except the first direction, and the tip extension moves in the first direction under a measuring force performed by the contour measuring probe.

5. The contour measuring method as claimed in claim 4, wherein the first direction is defined as a Z-axis, and two directions perpendicular to each other and perpendicular to the Z-axis are defined as an X-axis and a Y-axis, the tip extension is driven to move in an XZ plane of $Y=Y_0$ and the processor records a series of coordinates of a plurality of predetermined points as $(X_{m1}, Y_0, Z_{m1}), (X_{m2}, Y_0, Z_{m2}), (X_{m3}, Y_0, Z_{m3}) \ldots (X_{mi}, Y_0, Z_{mi})$, the processor calculates a series of ideal coordinates of points of the ideal object as $(X_{n1}, Y_0, Z_{n1}), (X_{n2}, Y_0, Z_{n2}), (X_{n3}, Y_0, Z_{n3}) \ldots (X_{ni}, Y_0, Z_{ni})$ according to a function $Z=f(X, Y)$ of an aspect of the ideal object, and the processor compares the measured coordinates with the ideal coordinates to gain a difference between an real aspect and the ideal aspect of the object, thus, a series of Z-axis difference values between the measured coordinates with the ideal coordinates are gained as $\Delta Z_1 = Z_{m1} - Z_{n1}$, $\Delta Z_2 = Z_{m2} - Z_{n2}$, $\Delta Z_3 = Z_{m3} - Z_{n3}$ ... $\Delta Z_i = Z_{mi} - Z_{ni}$.

6. The contour measuring method as claimed in claim 5, wherein the tip extension is driven to move to other XZ planes of $Y=Y_1, Y=Y_2, Y=Y_3 \ldots Y=Y_i$, and the steps in claim 5 are repeated.

7. The contour measuring method as claimed in claim 1, wherein the first direction is defined as a Z-axis, and two directions perpendicular to each other and perpendicular to the Z-axis are defined as an X-axis and a Y-axis, the tip extension is driven to move in a space of XYZ.

8. The contour measuring method as claimed in claim 1, wherein the contour measuring probe further comprises at least one hollow tube and an air discharge system, the at least one hollow tube is configured to force the tip extension to move in the first direction, and the air discharge system is configured to eject air, pumped into the at least one hollow tube, out of the hollow tube.

9. The contour measuring method as claimed in claim 8, wherein the contour measuring probe further comprises at least one tube guide defining at least one tube chute therein, the at least one hollow tube runs through a corresponding tube chute, a gap is defined between the tube guide and the at least one hollow tube, and when air is pumped in the gap, an air bearing is formed.

10. The contour measuring method as claimed in claim 8, wherein the contour measuring probe further comprises at least one pipe disposed at an end of the at least one hollow tube, air is pumped into the at least one hollow tube via the at least one pipe to push the at least one hollow tube to move.

11. The contour measuring method as claimed in claim 8, wherein the contour measuring probe further comprises at least one tube for allowing air to be pumped on a sidewall of the at least one hollow tube, the at least one tube is oblique relative to an axis of the at least one hollow tube.

12. The contour measuring method as claimed in claim 1, wherein the first direction is parallel to a direction of gravity, the contour measuring probe comprises a movable rack including the tip extension, under gravitational forces the tip extension moves towards the object, and the contour measuring probe further comprises a gravity balancing mechanism for balancing a part of the gravitational force acting on the movable rack.

13. The contour measuring method as claimed in claim 12, wherein the gravity balancing mechanism is an elastic member generating an elastic force away from the direction of the gravitational forces acting on the movable rack.

14. The contour measuring method as claimed in claim 12, wherein the gravity balancing mechanism is at least one hollow tube being part of the movable rack, the at least one hollow tube is apt to move the movable rack in a direction away from the direction of the gravitational forces acting on the movable rack.

15. The contour measuring method as claimed in claim 12, wherein the contour measuring probe further comprises at least one tube guide defining at least one tube chute therein, the at least one hollow tube runs through the tube chute, a gap is defined between the tube guide and the at least one hollow tube, and when air is pumped in the gap, an air bearing is formed.

* * * * *